(12) United States Patent
Steinlechner et al.

(10) Patent No.: US 11,616,572 B2
(45) Date of Patent: Mar. 28, 2023

(54) OPTICAL FREE-SPACE COMMUNICATION

(71) Applicant: Fraunhofer-Gesellschaft zur Förderung der angewandten Forschung e.V., Munich (DE)

(72) Inventors: Fabian Steinlechner, Jena (DE); René Berlich, Jena (DE)

(73) Assignee: Fraunhofer-Gesellschaft zur Förderung der angewandten Forschung e.V.

( * ) Notice: Subject to any disclaimer, the term of this patent is extended or adjusted under 35 U.S.C. 154(b) by 0 days.

(21) Appl. No.: 17/529,957

(22) Filed: Nov. 18, 2021

(65) Prior Publication Data

US 2022/0158728 A1    May 19, 2022

(30) Foreign Application Priority Data

Nov. 19, 2020    (EP) .................................. 20208699

(51) Int. Cl.
*H04B 10/00*    (2013.01)
*H04B 10/112*    (2013.01)
*H04B 10/118*    (2013.01)
*H04B 10/70*    (2013.01)
*H04J 14/00*    (2006.01)

(52) U.S. Cl.
CPC ......... *H04B 10/112* (2013.01); *H04B 10/118* (2013.01); *H04B 10/70* (2013.01)

(58) Field of Classification Search
CPC ... H04B 10/11; H04B 10/112; H04B 10/1121; H04B 10/1123; H04B 10/1125; H04B 10/1127; H04B 10/1129; H04B 10/114; H04B 10/1141; H04B 10/1143; H04B 10/1149; H04B 10/116; H04B 10/118

See application file for complete search history.

(56) References Cited

U.S. PATENT DOCUMENTS 5,218,467 A * 6/1993 Ross ................. H04B 7/18521
                                                    398/124
2017/0026175 A1* 1/2017 Zhang ................. H04L 9/0855

FOREIGN PATENT DOCUMENTS

EP    3572870 A1    11/2019
EP    3672110 A1    6/2020

OTHER PUBLICATIONS

Extended European Search Report including Written Opinion for Application No. 20208699.7 dated May 20, 2021, pp. 1-9.

* cited by examiner

*Primary Examiner* — Daniel G Dobson
(74) *Attorney, Agent, or Firm* — Lerner, David, Littenberg, Krumholz & Mentlik, LLP (57) ABSTRACT

Transmitting at least two optical signals to at least two receivers, using a source, an alignment module, and a telescope. The telescope has a field of view in which the at least two receivers are located, and at least a first beam path and a second beam path are aligned in the alignment module in order to respectively steer the first optical signal via the telescope to the first receiver and the second optical signal via the telescope to the second receiver.

14 Claims, 9 Drawing Sheets

OPTICAL FREE-SPACE COMMUNICATION

CROSS-REFERENCE TO RELATED APPLICATIONS

The present application claims priority from European Patent Application No. 202086699.7, filed on Nov. 19, 2020, the disclosure of which is hereby incorporated herein by reference.

TECHNICAL FIELD

The present invention relates to the transmission of optical signals, and more particularly to the transmission of at least two optical signals to at least two receivers.

BACKGROUND

Optical signals like quantum states of light, in particular single-photon states allow the transmission of information between users, and thus enable secure communication or the generation of a secure key by quantum key distribution. The transmission of optical signals like quantum states of light or single photons is for example limited by the losses in the transmission channel, whereas the transmission via a free-space link allows to overcome the distance limitation of terrestrial fiber-based transmission. The feasibility of free-space links for the transmission of optical signals, especially of quantum states or single photons for a secure communication has been shown for example from a LEO satellite with two independent transmitter downlinks towards two earth-based receivers. In known systems the downlinks are established by aligning each telescope to the earth-based receiver, steering the optical signal with the movement of the telescope.

For the communication between two spatially separated receivers via a source, generally in the case when the receivers are located on two spatially separated ground stations and the source is located on a satellite, in known systems the satellite comprises two telescopes, each telescope guiding one optical signal along a beam path to one receiver. Or in another possible arrangement the satellite has only one telescope leading to a transmission of the first optical signal to the first receiver in a first instance and after that a correction of the guidance by the telescope is performed followed by a transmission of the second optical signal to the second receiver.

BRIEF SUMMARY

It is an object of the present invention to provide a secure, improved, and cost-efficient transmission system for the transmission of at least two optical signals to at least two receivers.

According to the present invention, a method for the transmission of at least two optical signals to at least two receivers is provided.

This object is achieved by a method for the transmission of at least two optical signals to at least two receivers, preferably comprising a source, an alignment module, one telescope and at least two receivers, whereas the source generates two or more optical signals, at least a first optical signal and a second optical signal, and whereas the first optical signal is guided on a first beam path from the source via the alignment module and the one telescope to the first receiver and the second optical signal is guided on a second beam path from the source via the alignment module and the one telescope to the second receiver. According to the invention the one telescope has a field of view in which the at least first and second receivers are located, and the at least first and/or second beam path is aligned in the alignment module in order to steer the first optical signal via the one telescope to the first receiver and in order to steer the second optical signal via the one telescope to the second receiver.

The object is further achieved by a system for the transmission of at least two optical signals to at least two receivers, comprising a source, an alignment module, one telescope, and at least two receivers, at least a first receiver and a second receiver, whereas in the source the at least two optical signals are generated, at least a first and a second optical signal, whereas the first optical signal is guided on a first beam path from the source via the alignment module and the one telescope to the first receiver and the second optical signal is guided on a second beam path from the source via the alignment module and the one telescope to the second receiver. According to the invention the system comprises a single telescope, whereas the one telescope has a field of view in which the at least first and second receivers are located, and the alignment module comprises a at least first and/or second alignment means, preferably for the first and/or second optical signal, in order to steers the at least first optical signal via the one telescope to the first receiver and the second optical signal via the one telescope to the second receiver, and the at least two receivers comprise a detection means or a redirection means, in order to detect and/or redirect the at least first and second optical signal.

By the inventive method and the inventive system, the beam path of the at least first and second optical signal is steered by the alignment means arranged in front of the single telescope. That means, the at least two beam paths are guided through the same telescope, while the single telescope has a field of view in which both receivers are located. The accurate guidance of the first signal to the first receiver and the second signal to the second receiver is realized by the alignment means, while the telescope has a field of view in which both receivers are located. Preferably with the same field of view of the telescope, or without a need to change of the field of view of the telescope.

The inventive method and system allow an optical transmission of a multitude (two or more) of optical signals in several communication channels via the single optical telescope to receivers located in the field of view of the telescope. Thereby it is possible to steer the optical signals in order to selectively choose one receiver and switch between receivers located in the field of view of the telescope for each of the at least two optical signals, whereas the selectively choosing and the switching is realized by the alignment module. For this method and system, it is not necessary to have one separate telescope for each optical signal and for each receiver, or it is not necessary to align the telescope for a communication between two receivers in order to guide the optical signal at first to the first receiver and afterwards to the second receiver. In the inventive method and system, the signal paths of the optical signals are steered at the same time in the alignment module located in front of the telescope.

Due to a communication to a multitude of receivers via a single telescope the cost of the communication is reduced drastically. In addition, the transmission quality and the transmission rate are increased by the inventive method and the system by the reduction of systematic errors. This is realized by using the same single telescope for the transmission of a multitude of optical signals. Using a multitude of telescopes implies systematic errors because of the manufacturing inaccuracies and/or aging processes influencing for example the polarization of the optical signal during the transmission or create different phase distortions in different telescopes.

Here the beam path describes the optical beam axis of a beam, whereas the beam propagates along the optical beam axis with a beam diameter. The beam diameter is defined by the intensity profile, or the probability distribution, or the probability amplitude, or the field distribution of the optical signal, or to measure a single photon of the optical signal.

In a preferred embodiment, the alignment in the alignment module of the at least first and/or second beam path is characterized by
- a shift of the first and/or second beam path, preferably parallel and/or off axes of the optical axes of the telescope, and/or
- a tilt of the first and/or second beam path, preferably by angle of incident >0 to the optical axes of the telescope.

Preferably the shift and/or the tilt are determined for the beam path on an entrance plane of the telescope. By the shift and/or tilt a tailored spatial distribution of the first and the second optical signal is fed into the telescope. Preferably shift means here, a lateral displacement of the incident beam path out of the optical axis of the telescope at the entrance plane, preferably independent of the angle of incident of the beam path. Preferably tilt means here, a change of the angle of incidence of the beam path out of the optical axis of the telescope at the entrance plane, preferably independent of the shift of the beam path.

In a preferred embodiment, the alignment is realized in such a manner, that the diffraction angle and the direction angle of the first and second optical signal guided through the telescope is smaller than the separation angle of the two receivers as seen from the telescope.

In a preferred embodiment, the alignment in the alignment module is realized in order to steer the at least first and/or second beam path
- to be shifted parallel and off axes of the optical axes of the telescope, or
- to have an angle of incident >0 to the optical axes of the telescope, or
- to be shifted off axes and have an angle of incident >0 to the optical axes of the telescope.

An optical signal entering the telescope parallel to the optical axis and on the optical axes is focused on a point of the extended optical axis of the telescope. In the inventive method and system, the optical signal enters the telescope outside the optical axis and/or not parallel to the optical axis (angled of incident >0). By this inventive method and system, the alignment of the two different beam paths in the alignment module is leading to two beams focused on two different points outside the extended optical axis of the telescope on the two receivers.

In a preferred embodiment, the shift is a distance x out of the optical axes of the telescope in the entrance plane of the telescope.

In a preferred embodiment, the tilt is an angle $\alpha>0$ to the optical axes of the telescope in the entrance plane of the telescope.

In a preferred embodiment, the shift and/or the tilt is in an arbitrary direction out of the optical axes of the telescope. Due to the arbitrary directions, the at least first and/or second beam paths for example can be shifted by the same distance x but in different direction described by different angels on the circle/plane of the entrance plane of the telescope.

In a preferred embodiment, the at least first beam path is shifted by a distance $x_1$ and/or tilted by an angle $\alpha_1$, and the at least second beam path is shifted by a distance $x_2$ and/or tilted by an angle $\alpha_2$, whereas preferably $x_1 \neq x_2$, and/or $\alpha_1 \neq \alpha_2$.

In a preferred embodiment, the first beam path and second beam path are partially spatially separated or completely spatially separated, preferably by $y=x_1+x_2$, or
- include an angle to each other, preferably an angle $\beta=\alpha_1+\alpha_2$, or
- are partially spatially separated or completely spatially separated and include an angle to each other.

Preferably the separation y and/or the angle β are determined on an entrance plane of the telescope and/or during the transmission of the telescope. Whereas x is the distance for the first beam path to the optical axes and $x_1$ is the distance for the second beam path to the optical axes, preferably on the plane of the entrance plane of the telescope. And whereas $\alpha_1$ is the angle of incident of the first beam path to the optical axes and $\alpha_2$ is the angle of incident of the second beam path to the optical axes, preferably on the plane of the entrance plane of the telescope.

Partially spatially separation means, that a part of the beam-paths can overlap but not the hole beam-paths overlaps. Preferably the at least first and second beam paths are guided through the telescope completely off axes or at least partially off axes of the optical axes of the telescope.

In a preferred embodiment, the alignment enables a tracking of the at least first and/or second receiver while the source, and the alignment module, and the telescope or the at least first and/or second receiver are moving to each other. In a preferred embodiment, the alignment is characterized by tracking the at least first and/or second receiver while the source, and the alignment module, and the telescope or the at least first and/or second receiver are moving to each other.

In a preferred embodiment, the alignment enables a switching of the at least first and/or second optical signal between a multitude of receivers. In a preferred embodiment, the alignment is characterized by addressing different receivers with the first and/or second optical signal and/or to switch the at least first and/or second optical signal between a multitude of receivers.

In a preferred embodiment, the transmission of the least two optical signals to the at least two receivers are realized simultaneous. That means, a correction of the telescope alignment is not necessary to guide the first signal to the first receiver and the second signal to the second receiver. Essential is, that the two receivers are located within the field of view of the one telescope.

In a preferred embodiment, the optical signal is a quantum signal, or a quantum state of light, or a single photon state, or a faint laser pulse, preferably a single photon, or an entangled photon state, preferably an entangled photon of an entangled photon pair or an entangled three- or more-photon state.

In a preferred embodiment, the entangled photon state is entangled in polarization, and/or time, and/or frequency, and/or orbital angular momentum (OAM) or spin angular momentum (SAM).

In a preferred embodiment, the beam path of the optical signal is the optical beam axis of a beam, whereas the beam propagates along the optical beam axis with a beam diameter. In a preferred embodiment, the beam is collimated, or focused, or divergent, preferably on an entrance plane of the telescope and/or during the transmission of the telescope and towards the receiver. Preferably the beam is a Gaussian beam, preferably a Gaussian beam in the source, and/or the alignment module, and/or the telescope. Preferably the beam with the beam diameter is collimated, or focused, or divergent over the whole beam path or is collimated, or focused, or divergent over different sections of the beam path and is changed by additional optical components in the source, the alignment module, the telescope, or in between.

Preferably the beam diameter is defined by the intensity profile, or the probability distribution, or the probability amplitude, or the field distribution of the optical signal, or to measure a single photon of the optical signal by at least 90%, preferably by 95%, preferably by 97%, preferably by 99%.

In a preferred embodiment, the at least first beam of the first optical signal is focused on the first receiver, and the at least second beam of the second optical signal is focused on the second receiver. Preferably the first and/or second beam is focused by the telescope or by the telescope and the alignment module.

In a preferred embodiment, in the at least first beam with the first beam diameter the first receiver is located, and in the at least second beam with the second beam diameter the second receiver is located.

In a preferred embodiment, the transmission of the at least first and second optical signal is used for optical communication, or for optical communication with single photons, or for quantum key distribution (QKD), preferably between the at least first and second receiver.

In a preferred embodiment, the transmission system is capable for optical communication or quantum key distribution (QKD).

In a preferred embodiment, the transmission of the at least first and second optical signal is realized at the same time towards the at least first and second receiver. To allow the transmission to the first and second receiver at the same time, both receivers have to be located inside the field of view of the one telescope at the same time.

In a preferred embodiment, the transmission of the at least first and second optical signal is realized to establish a secure communication between the first and second receiver, and/or to generate a secure key by quantum key distribution (QKD).

In a preferred embodiment, the source generates three optical signals for the communication between three receivers, whereas all three receivers are located in field of view of the telescope. In a preferred embodiment, the source generates four optical signals for the communication between either two times two receivers or between all four receivers, whereas all four receivers are located in field of view of the telescope. In a preferred embodiment, the source generates more optical signals for the communication between more receivers, whereas all the receivers are located in field of view of the telescope.

In a preferred embodiment, the source comprise one signal generation means or a multitude of signal generation means, whereas each signal generation means generates at least one or more optical signals. In a preferred embodiment, the signal generation means generates the at least first optical signal and/or the second optical signal.

In a preferred embodiment, the one or more signal generation means is a single photon source, or a faint laser pulse source, or an entangled photon source.

In a preferred embodiment, the entangled photon pairs are used for a QKD (quantum key distribution), preferably to generate a key in the at least two receivers.

In a preferred embodiment, the first and second beam paths are separated in the source by a separation means, preferably the separation means is a beam splitter, or a polarization beam splitter, or a dichroic mirror, or a Spatial Light Modulator (SLM).

In a preferred embodiment, the first and second beam paths are separated by the generation of the first and second optical signals in two spatially separated signal generation means.

In a preferred embodiment, the signal generation means is an entangled photon source generating an entangled photon pair. In a preferred embodiment, the signal generation means is an entangled photon source generating two or more entangled photon pairs, whereas the two or more entangled photon pairs are guided on spatially separated propagation modes.

In a preferred embodiment the signal generation means generates two or more entangled photon pairs, at least a first entangled photon pair and a second entangled photon pair, whereas each entangled photon pair consists of two entangled photons, and whereas the at least first entangled photon pair and the second entangled photon pair are spatially separated by the generation process and/or by a pair-spatially-separation means, and whereas the first and second photon of each entangled photon pair are spatially separated by the generation process and/or by a photon-spatially-separation means. Preferably the pair-spatially-separation means and/or the photon-spatially-separation means is a lens, or a lens system, or an optical component, or an aperture. Preferably for each entangled photon pair a separate pair-spatially-separation means is arranged in the source. Preferably for each entangled photon a separate photon-spatially-separation means is arranged in the source. Preferably one or two photon-spatially-separation means build one pair-spatially-separation means.

In a preferred embodiment, the alignment module comprises a first alignment means for the first optical signal, preferably in order to align the first optical signal, and/or a second alignment means for the second optical signal, preferably in order to align the second optical signal.

In a preferred embodiment, the alignment in the alignment module is realized by the first and/or second alignment means.

In a preferred embodiment, the first and/or second alignment means comprise a fiber with a shiftable and/or tiltable fiber output, and/or a tiltable beam steering mirror, and/or a deformable mirror, and/or a spatial light modulator, and/or a shiftable and/or tiltable lens or lens system, and/or a shiftable and/or tiltable prism or prism system.

In a preferred embodiment, the alignment module comprises an optical component in order to collimate the beam path of the optical signal with the beam diameter, preferably the optical component is a lens, or a lens system, or a collimator. Preferably the alignment module comprises one optical component for the at least first optical signal and the second optical system, or one optical component for each optical signal order to collimate the beam paths.

In a preferred embodiment, the source and/or the alignment means, and/or the telescope, and/or the receivers comprise an adaptive optics system, preferably in order for the pre-compensate of atmosphere distortion of the propagation wave front of the beam. Preferably the source and/or the alignment means, and/or the telescope comprise one adaptive optics system for each optical signal. Preferably a first adaptive optics system pre-compensates the first optical signal, and a second adaptive optics system pre-compensates the second optical signal. In a preferred embodiment, the first and/or second optical signal is sent via an adaptive optics system in order for the pre-compensate of atmosphere distortion of the propagation wave front of the beam.

In a preferred embodiment, the adaptive optics system comprises a beacon laser on the receiving side, a wavefront sensor and a correction means on the sending side. Preferably the correction means is a deformable mirror. Preferably the correction means is a correction means and an alignment means, preferably arranged in the alignment module.

In a preferred embodiment, the source and/or the alignment means, and/or the telescope, and/or the receivers comprise a tracking system, preferably in order to steer the at least first and/or second optical signal to the at least first and or second receiver. Preferably the source and/or the alignment means, and/or the telescope comprise one tracking system for each optical signal.

In a preferred embodiment, the tracking system comprise a tracking beacon laser at the at least first and/or second receiver, and the source, or the alignment module, or the telescope comprise a detector for the tracking beacon laser. Preferably the detector sends a signal to a tracking control.

In a preferred embodiment, the tracking control aligns the at least first and/or second alignment means, in order to steer the at least first and/or second optical signal to the at least first and or second receiver.

In a preferred embodiment, the first optical signal is focused on the first receiver by the telescope, preferably by the telescope and the alignment module, and the second optical signal is focused on the second receiver by the telescope, preferably by the telescope and the alignment module.

In a preferred embodiment, the telescope comprises a multitude of lenses and/or mirrors, in order to focus the at least first and/or second optical signal on the at least first and/or second receiver.

In a preferred embodiment, the entrance plane of the telescope is defined by the surface of the first lens, or by the principal plane of the first lens or lens system, or by a virtual plane perpendicular to the optical axis on the outermost point of the lens of the telescope in the direction to the alignment means. The principal plane or planes are planes defined in the model of paraxial optics in an imaging system, in which the refractions of the light beams are assumed. Preferably the entrance plane is an arbitrary plane in the telescope perpendicular to the optical axis of the telescope.

In a preferred embodiment, the source or the alignment module, or the alignment means of the alignment module is arranged in the object plane of the telescope. Preferably the at least first and/or second receiver is arranged in the image plane of the telescope. In a preferred embodiment, the one telescope has a diameter of at least 0.3 m, preferably at least 0.5 m, preferably more than 1 m, preferably a diameter in order to meet the link budget requirements, preferably the link budget requirements for quantum key distribution.

In a preferred embodiment, the telescope optics is optimized in order to compensate optical errors for the at least first and/or second optical signal guided in the at least first and/or second optical path to the at least first and/or second receiver.

Optimization means, that the telescope optics is prepared to compensate optical errors like aberrations, and/or spherical aberrations, and/or lateral object points aberrations, and/or astigmatisms, and/or image distortions, and/or curvature of the field image, and/or distortion, and/or chromatic aberration, and/or lateral chromatic aberration, and/or longitudinal color defects, and/or Gaussian error, and/or achromat errors, and/or apochromat errors, and/or axial astigmatism. Preferably the optimization is realized for beam paths outside the optical axis of the telescope.

Preferably the optimization forms optimized sub-areas in with the receiver are located, preferably in with the optical signal is sent. Preferably the source, the alignment module and the telescope are stationary to the receiver in order to send the optical signals via the optimized sub-areas to the receivers.

Preferably the optimization is such, that in the field of view of the telescope is separated in an overall field of view and optimized sub-areas.

In a preferred embodiment, the beam diameter of the first beam path and/or the beam diameter of the second beam path and/or the beam diameter of all beam paths is between 95% and 80% of the diameter of the telescope, preferably between 80% and 70% of the diameter of the telescope, preferably between 70% an 50% of the diameter of the telescope, preferably below 50% of the diameter of the telescope. With a smaller beam diameter, a larger separation of the beam paths on the receivers is possible by a larger separation and/or a larger angel of incident on the telescope.

In a preferred embodiment, the source and the alignment module and the telescope are arranged on a satellite, or a ground station, or a mobile ground station. The ground station can be a stationary station for example in a building, the mobile ground station can be a mobile station for example in a car or a truck or a mobile container or a non-stationary building.

In a preferred embodiment, the source and the alignment module and the telescope are moving in respect to the at least first and/or second receivers.

In a preferred embodiment, the source and the alignment module and the telescope are stationary in respect to the at least first and/or second receivers.

In a preferred embodiment, the source and the alignment module and the telescope are located on a satellite in geostationary orbit (GEO), or medium Earth orbit (MEO), or in low Earth orbit (LEO), or in between.

In the following, a non-exclusive example for a source on a GEO satellite and the separation of the receivers are given:

In this non-exclusive example, the source and the alignment module and the telescope are located on a Satellite in geostationary orbit (GEO) around 3600000 km above Earth. The optical signal hast a wavelength of 810 nm, for example generated in an entangled photon source, generating an entangled photon pair, the first and the second optical signal. The alignment module comprises two single mode fiber with 5 µm core diameter which can be shifted out of the optical axis of the telescope. The telescope in this example has a 1 m diameter with a focal length of 4.31 m, and a field of view of 2 mrad, leading to a beam divergence at the telescope output of 0.00116 mrad and a field of view of 72 km on the ground. The first and second not collimated optical signals are coupled out of the shifted fibers and guided to the telescope leading to a 42 m beam diameter of the first and second beam on the ground. In this example the two receivers can be separated within the 72 km field of view and when the two receivers are separated by at least 42 m the first optical signal can be sent to the first receiver only and the second optical signal can be sent to the second receiver only. For a maximal separation of the 72 km the shift of the two fibers would be in the range of 8.6 mm out of the optical axis of the telescope.

In a preferred embodiment, the at least two receivers are spatially separated, preferably at least spatially separated by a distance at least or more than the beam diameter of the first and second beam.

In a preferred embodiment, the at least first receiver is located outside the second beam diameter of the second beam, and the at least second receiver is located outside the first beam diameter of the first beam.

In a preferred embodiment, the at least first receiver is located inside the second beam diameter, whereas the intensity profile, or the probability distribution, or the probability amplitude, or the field distribution of the optical signal, or to measure a single photon of the optical signal of the second beam on the first receiver is smaller than the intensity profile, or the probability distribution, or the probability amplitude, or the field distribution of the optical signal, or to measure a single photon of the optical signal of the second beam on the second receiver. Preferably the ratio is between 40:60 and 30:70, or between 30:70 and 10:90, or between 10:90 and 1:99, for the first receiver and the second receiver respectively.

In a preferred embodiment, the signal to noise ratio of the second optical signal on the second receiver is higher than the signal to noise ratio of the second optical signal on the first receiver.

In a preferred embodiment, the at least second receiver is located inside the first beam diameter, whereas the intensity profile, or the probability distribution, or the probability amplitude, or the field distribution of the optical signal, or to measure a single photon of the optical signal of the first beam on the second receiver is smaller than the intensity profile, or the probability distribution, or the probability amplitude, or the field distribution of the optical signal, or to measure a single photon of the optical signal of the second beam on the first receiver. Preferably the ratio is between 40:60 and 30:70, or between 30:70 and 10:90, or between 10:90 and 1:99, for the second receiver and the first receiver respectively.

In a preferred embodiment, the signal to noise ratio of the first optical signal on the first receiver is higher than the signal to noise ratio of the first optical signal on the second receiver.

In a preferred embodiment, the communication is realized between the first and the second receivers, preferably the switching is realized in order to realize a communication between the first and a third receivers. For example, at first the first signal is sent to the first receiver and the second signal is sent to the second receiver in order to realize a communication between the first and second receivers. Preferably the second signal is than guided to a third receivers by steering the beam path of the second signal by the alignment module to the third receivers, enabling a communication between the first and the third receiver.

In a preferred embodiment, the at least first and/or second receivers are located on a Satellite, or a ground station, or a mobile ground station. The ground station can be a stationary station for example in a building, the mobile ground station can be a mobile station in a car or a truck or a mobile container or a non-stationary building.

In a preferred embodiment, the at least two receivers communicates the time, and/or the frequency and/or the polarization, and/or the orbital angular momentum (OAM) and/or the spin angular momentum (SAM) of the optical signals and/or one or more detected photons to the other receivers and/or a coincidence module, in order to detect coincidences of an entangled photon pair between the at least two receivers and/or to calculate the visibility and/or the quantum bit error rate (QBER) and/or to establish a QKD (quantum key distribution).

In a preferred embodiment, the at least first/and or second receivers is located outside of the extended optical axis of the telescope, preferably all receivers are located outside of the extended optical axis of the telescope.

In a preferred embodiment, the first and/or second optical signal guided on the first and/or second beam path are steered and/or focused on a point outside of the extended optical axis of the telescope.

In a preferred embodiment, the first and/or second receiver comprise a detection means, in order to detect the first or second signal, or a coupling means, in order to redirect or to forward the first or second signal to a detection means, preferably to a detection means located in the receiver or spatially separated from the receiver. Preferably the forwarding of the first or second signal is realized in a guided channel or a free-space channel, whereas the guided channel can be a fiber.

In a preferred embodiment, the first and/or second receiver comprise an optical component, preferably in order to guide the first or second signal to the detection means or the coupling means. Preferably the optical component is a lens, or a lens system, or a telescope.

In a preferred embodiment, the detection means comprise one or more detectors to measure the photons in at least two mutually unbiased measurement bases, and/or to measure the photons in at least one or more orthogonal states.

In a preferred embodiment, the one or more detectors are single photon detectors, preferably germanium (Ge), or silicon (Si), or germanium on silicon (Ge on Si) single-photon avalanche diode (SPAD), or Indium gallium arsenide (InGaAs/Inp) single photon detectors, or semiconductor-based single-photon avalanche diode (SPAD), or superconducting nanowire single-photon detector (SNSPD), or Silicon Avalanche Photodiodes (Si APD).

In a preferred embodiment, the detection means comprise a bell measurement setup for QKD (quantum key distribution) or for quantum teleportation or as a quantum repeater.

In a preferred embodiment, the system for the transmission of at least two optical signals to at least two receivers, is an apparatus comprising a source, an alignment module, one telescope, and at least two receivers, at least a first receiver and a second receiver, whereas in the source the at least two optical signals are generated, at least a first and a second optical signal, whereas the first optical signal is guided on a first beam path from the source via the alignment module and the one telescope to the first receiver and the second optical signal is guided on a second beam path from the source via the alignment module and the one telescope to the second receiver. According to the invention the system comprises a single telescope, whereas the one telescope has a field of view in which the at least first and second receivers are located, and the alignment module comprises a at least first and/or second alignment means, preferably for the first and/or second optical signal, in order to steers the at least first optical signal via the one telescope to the first receiver and the second optical signal via the one telescope to the second receiver, and the at least two receivers comprise a detection means or a redirection means, in order to detect and/or redirect the at least first and second optical signal.

The above and other aspects, features and advantages of the present invention will become more apparent from the following detailed description when taken in conjunction with the accompanying drawings.

DETAILED DESCRIPTION

Figure 1:
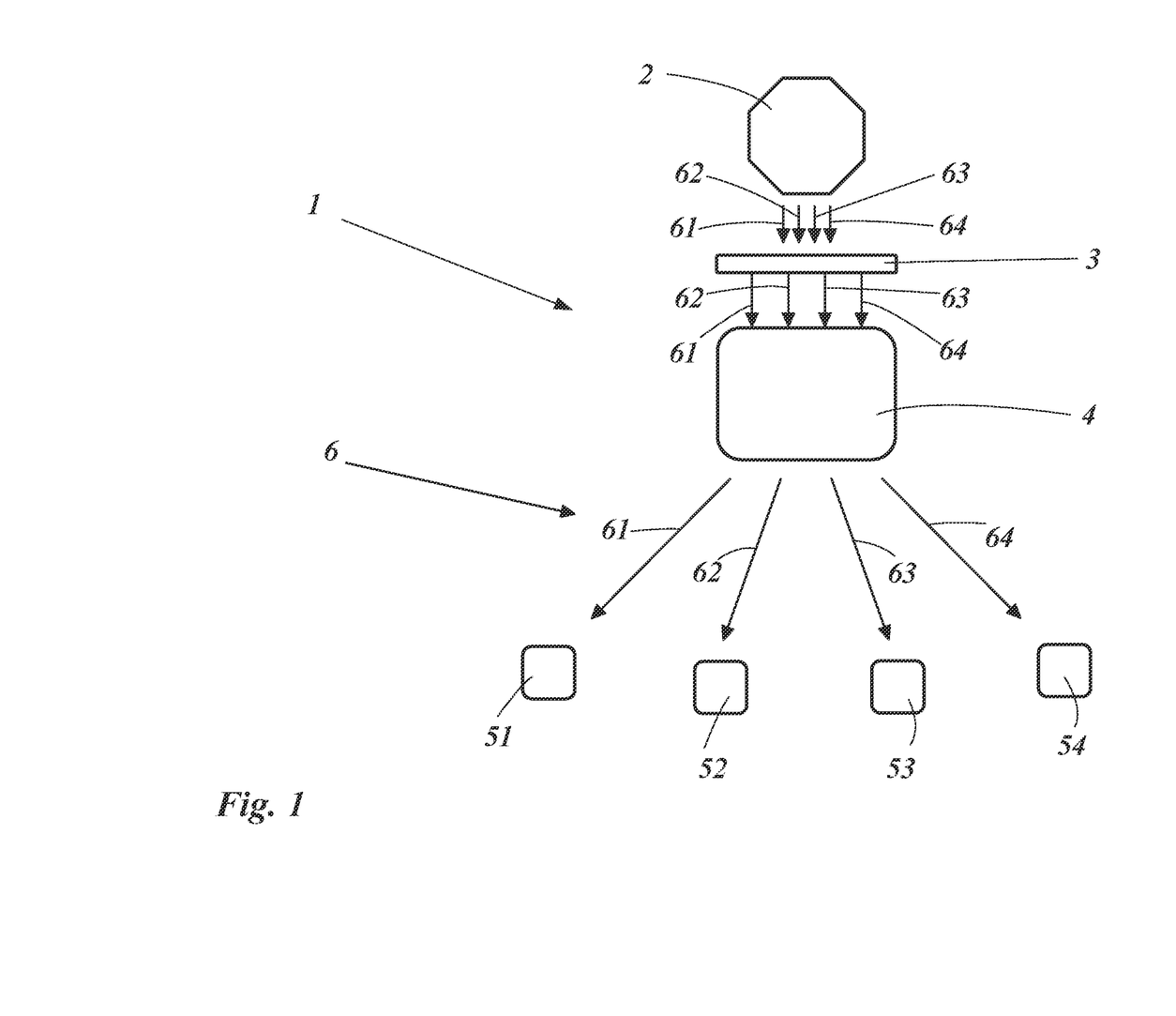
FIG. 1 is a schematic diagram of the inventive method and system for the transmission of at least two optical signals to at least two receivers.

FIG. 1 shows the inventive transmission system 1 and the inventive method for the transmission with the transmission system 1 comprising a source 2, an alignment module 3, a single telescope 4 and in the example of the FIG. 1 four receivers, a first receiver 51, a second receiver 52, a third receiver 53 and a fourth receiver 54. The source 3 generates in the example of FIG. 1 four optical signals, whereas the first optical signal is guided on a first beam path 61 from the source 2 via the alignment module 3 and the one telescope 4 to the first receiver 51, and whereas the second optical signal is guided on a second beam path 62 from the source 2 via the alignment module 3 and the one telescope 4 to the second receiver 52, and whereas the third optical signal is guided on a third beam path 63 from the source 2 via the alignment module 3 and the one telescope 4 to the third receiver 53, and whereas the fourth optical signal is guided on a fourth beam path 64 from the source 2 via the alignment module 3 and the one telescope 4 to the fourth receiver 54.

Each beam path in the FIGS. 1 to 9 describes the optical beam axis of a beam, whereas the beam comprises a beam diameter. The beam diameter (shown in FIGS. 6 to 9) is defined by the intensity profile, or the probability distribution, or the probability amplitude, or the field distribution of the optical signal, or to measure a single photon of the optical signal.

The FIG. 2 shows different examples of the source 2 of the transmission system 1 and the method with the transmission system 1. In FIG. 2a a first example of the source 2 is shown with a single signal generation means 20 generating the first signal, guided via the first signal path 61, and generating the second signal, guided via the second signal path 62. In the example of the FIG. 2a the generation means 20 is an entangled photon source generation two spatially not separated signal. This can be realized by an entangled photon source with collinear phase matching conditions. The signal generation means 20 in FIG. 2a can also be a single photon source generation non-entangle photon pairs. The two not spatially separated signals are separated in the source 2 by a separation means 21, for example a polarizing beam splitter, or a beam splitter, or a dichroic mirror, and are guided via a mirror 22 or directly out of the source 2.

Figure 2A:
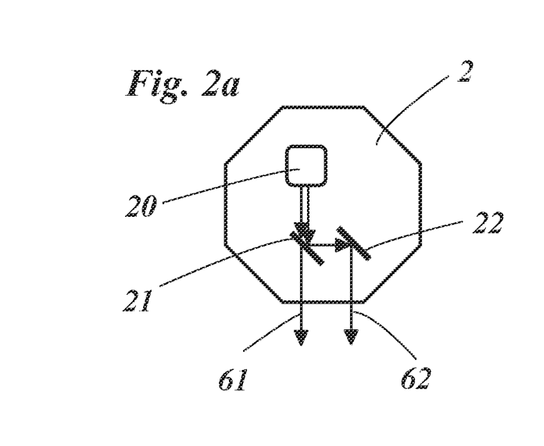
FIG. 2a is a first example of a source with a single generation means and a separation means.
Figure 2B:
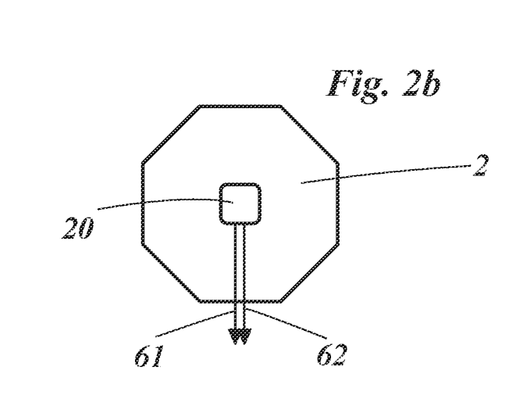
FIG. 2b is a second example of a source with a single generation means generating two spatially not separated signals.

FIG. 2b shows a second example of the source 2, which differs from FIG. 2a only in that the first signal on the first signal path 61 and the second signal on the second signal path 62 are not spatially separated in the source. In this example the spatially separation of the two optical signals can be realized in the alignment module.

Figure 2C:
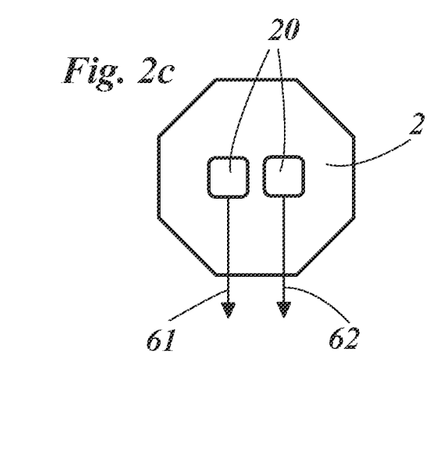
FIG. 2c is a third example of a source with two spatially separated signal generation means.

FIG. 2c shows a third example of a source 2 with two spatially separated signal generation means 20. Each generation means 20 is generating one signal, the first signal, guided on the first signal path 61, or the second signal, guided on the second signal path 62. The generation means 20 in this example can be a single photon generator like a quantum dot or laser generating a faint laser pulse.

Figure 2D:
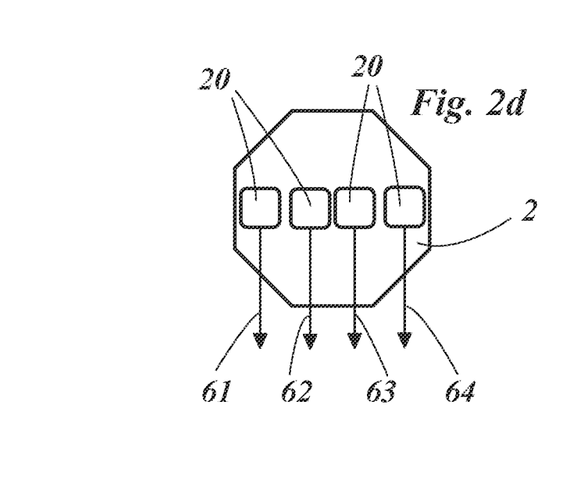
FIG. 2d is a fourth example of a source with four spatially separated signal generation means.

FIG. 2d shows a fourth example of a source 2 with four spatially separated signal generation means 20. FIG. 2d differs from FIG. 2c only in the quantity of the signal generation means 20 and thus in quantity of the generated signals.

Figure 3A:
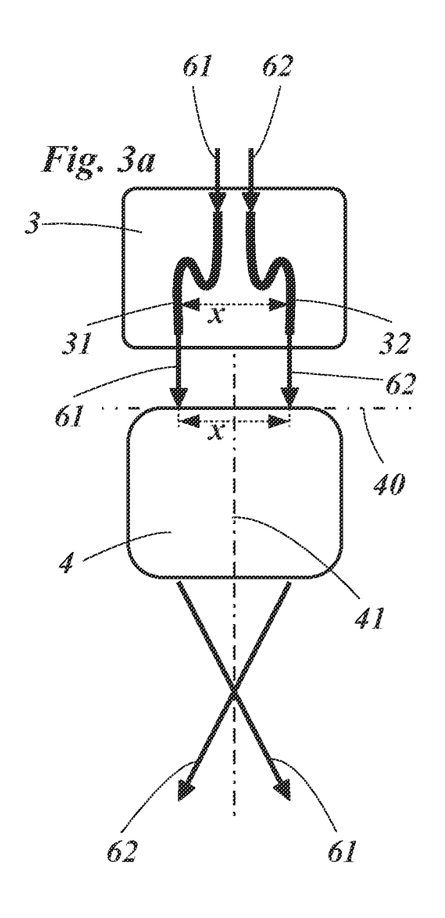
FIG. 3a is a schematic diagram of a first example of the alignment module and the telescope with shifted first and second optical signal.
Figure 3B:
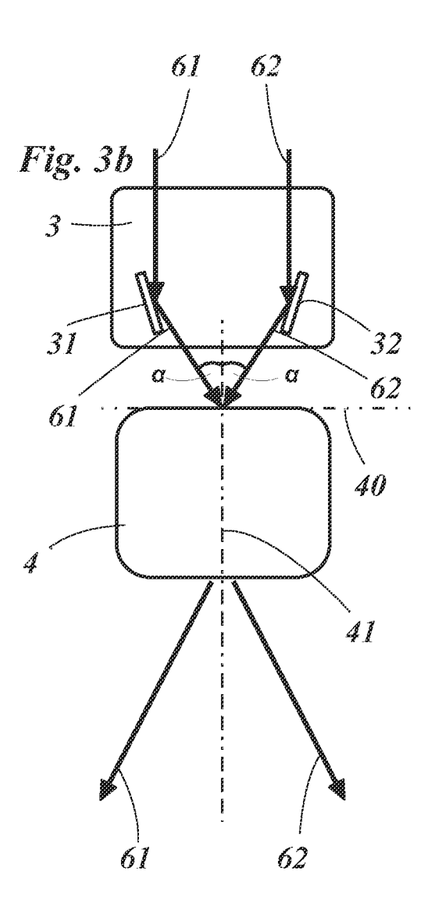
FIG. 3b is a schematic diagram of a second example of the alignment module and the telescope with an angle of incident to the optical axes of the telescope of the first and second optical signal.
Figure 3C:
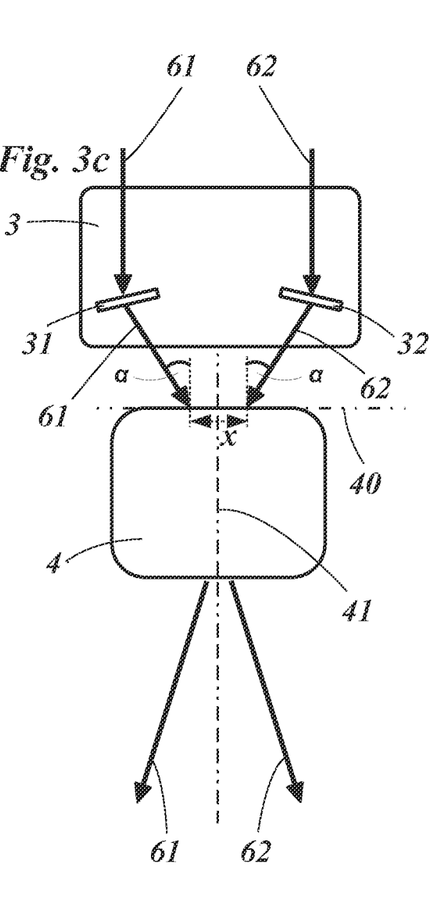
FIG. 3c is a schematic diagram of a third example of the alignment module and the telescope with shift and an angled of incident to the optical axes of the first and second optical signal.

The FIG. 3 shows different schematic diagrams for different examples of the alignment module 3 and the telescope 4 with the different alignment possibilities of shifting and/or tilting of the first optical signal on the first beam path 61 and the second optical signal on the second beam path 62 towards the telescope 4.

In the first example in FIG. 3a the alignment module 3 comprises two alignment means 31, 32, in the example of FIG. 3a two single mode fibers. The first signal, guided on the first beam path 61 is coupled into the first alignment means 31, the left single mode fiber. The second signal, guided on the second beam path 62 is coupled into the second alignment means 32, the right single mode fiber. It is also possible, that the optical signal is generated or coupled in the source into the fiber.

The first alignment means 31 and the second alignment means 32 are shifted in the alignment module 3 in order to have spatially separated outputs, leading to a shift of the first beam path 61 and the second beam path 62 by a distance x to each other. In the example of FIG. 3a the shift is symmetrically around the optical axis 41 of the telescope 4. It is also possible to shift the first alignment means 31 and the second alignment means 32 not symmetrically around the optical axis 41, and in addition, not only in the plan of view shown in the FIG. 3, but also out of the plan of view in the FIG. 3.

The alignment module 3 steers the first signal on the first signal path 61 and the second signal on the second signal path 62 spatially separated to the telescope 4. The alignment can be realized in the example of FIG. 3a by a motor changing the position of the fiber output. The spatially separation is controlled in such a way, that on the entrance plane 40 of the telescope 4 the two parallel beam paths in the example of FIG. 3a entering the telescope 4 not on the optical axis 41 of the telescope 4, but shifted to the optical axis 41. The spatially separation of the two beams is realized in such a way, that the first optical signal, guided on the first beam path 61 is focused by the telescope 4 on the first receiver 51 and the second optical signal, guided on the second optical path 62 is focused by the telescope 4 on the second receiver 52. This is realized by the transmission of both signals out of the optical axis 41 through the telescope 4.

An optical signal with a beam path entering the telescope 4 parallel to the optical axis 41 and on the optical axes 41 is focused on a point of the optical axis 41 of the telescope (not shown in the figures). In the inventive method and system shown in the FIGS. 1 to 7, the optical signal guided on a beam path enters the telescope 4 outside the optical axis 41 and/or not parallel to the optical axis 41 (angled of incident >0). By this inventive method and system, the steering of the different beam paths in the alignment module 3 is leading to two beam paths focused on two different points outside the extended optical axis 41 of the telescope 4 on the receivers.

FIG. 3b shows a second example of the alignment in the alignment module 3 and the telescope 4. In the second example the first alignment means 31 and the second alignment means 32 are mirrors. The alignment in the example of FIG. 3b is realized by tilting the first alignment means 31 and the second alignment means 32 in order to steer the first signal on the first beam path 61 and the second signal on the second beam path 62 each with an angle $\alpha$ to the optical axis 41 of the telescope 4 on the entrance plane 40 of the telescope 4. In the example of FIG. 3b the beam paths have not to be tilted symmetrical around the optical axis 41, and in addition, not only in the plan of view shown in the FIG. 3, but also out of the plan of view in the FIG. 3. As described before, the optical signal with a beam path entering the telescope 4 not parallel to the optical axis 41 (angled of incident >0) is leading to two beam paths focused on two different points outside the optical axis 41 of the telescope 4 on the receivers.

FIG. 3c shows a third example of the alignment in the alignment module 3 and the telescope 4 combining the two possible alignment methods shifting and tilting from the FIGS. 3a and 3b, by aligning the beam paths in such a way, that the beam paths are shifted off axes and in addition have an angle of incident >0 to the optical axes of the telescope. In the example of FIG. 3c the beam paths have not to be aligned symmetrically around the optical axis 41, and in addition, not only in the plan of view shown in the FIG. 3, but also out of the plan of view in the FIG. 3. As described before, the optical signal with a beam path entering the telescope 4 outside the optical axis 41 and not parallel to the optical axis 41 (angled of incident >0) is leading to two beam paths focused on two different points outside the optical axis 41 of the telescope 4 on the receivers.

Figure 4A:
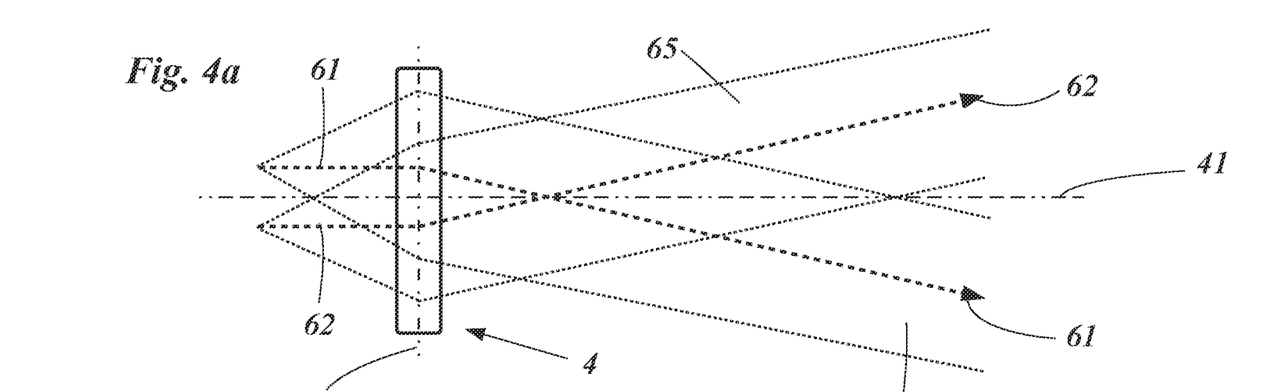
FIG. 4a is a schematic diagram of the beam paths through the telescope with shifted first and second optical signal.
Figure 4B:
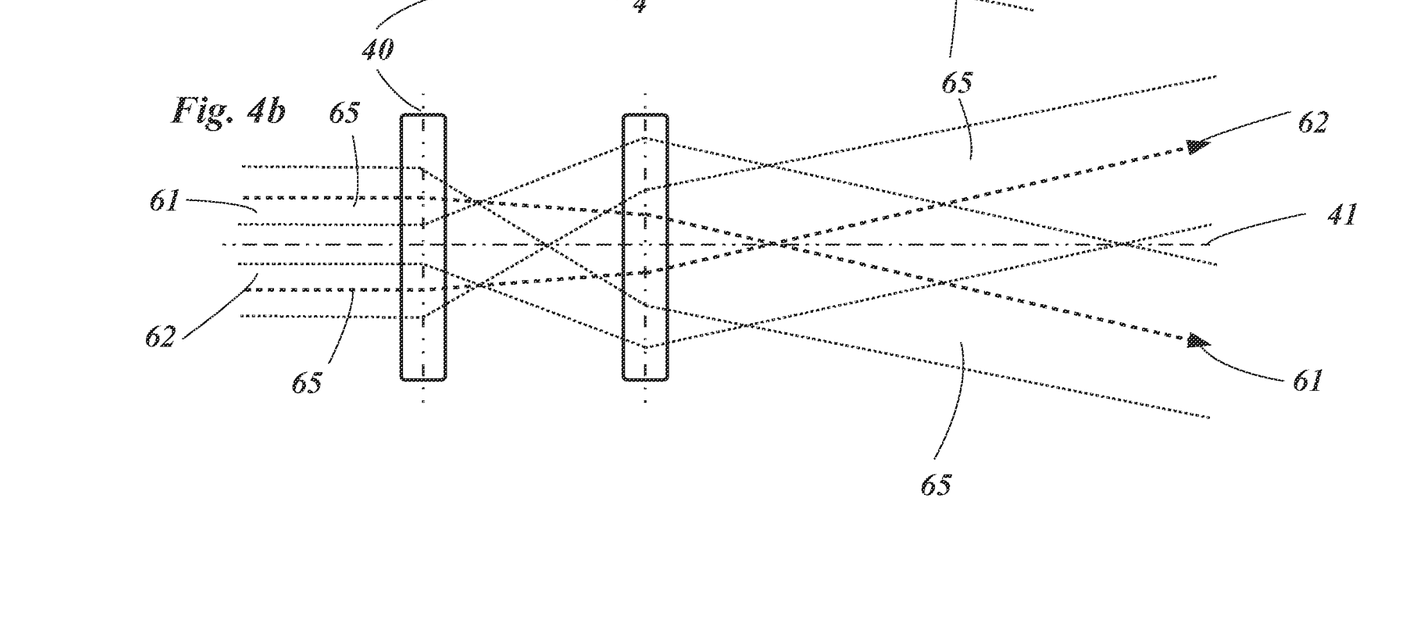
FIG. 4b is a schematic diagram of the beam paths through the telescope with shifted first and second optical signal and collimated beams.
Figure 4C:
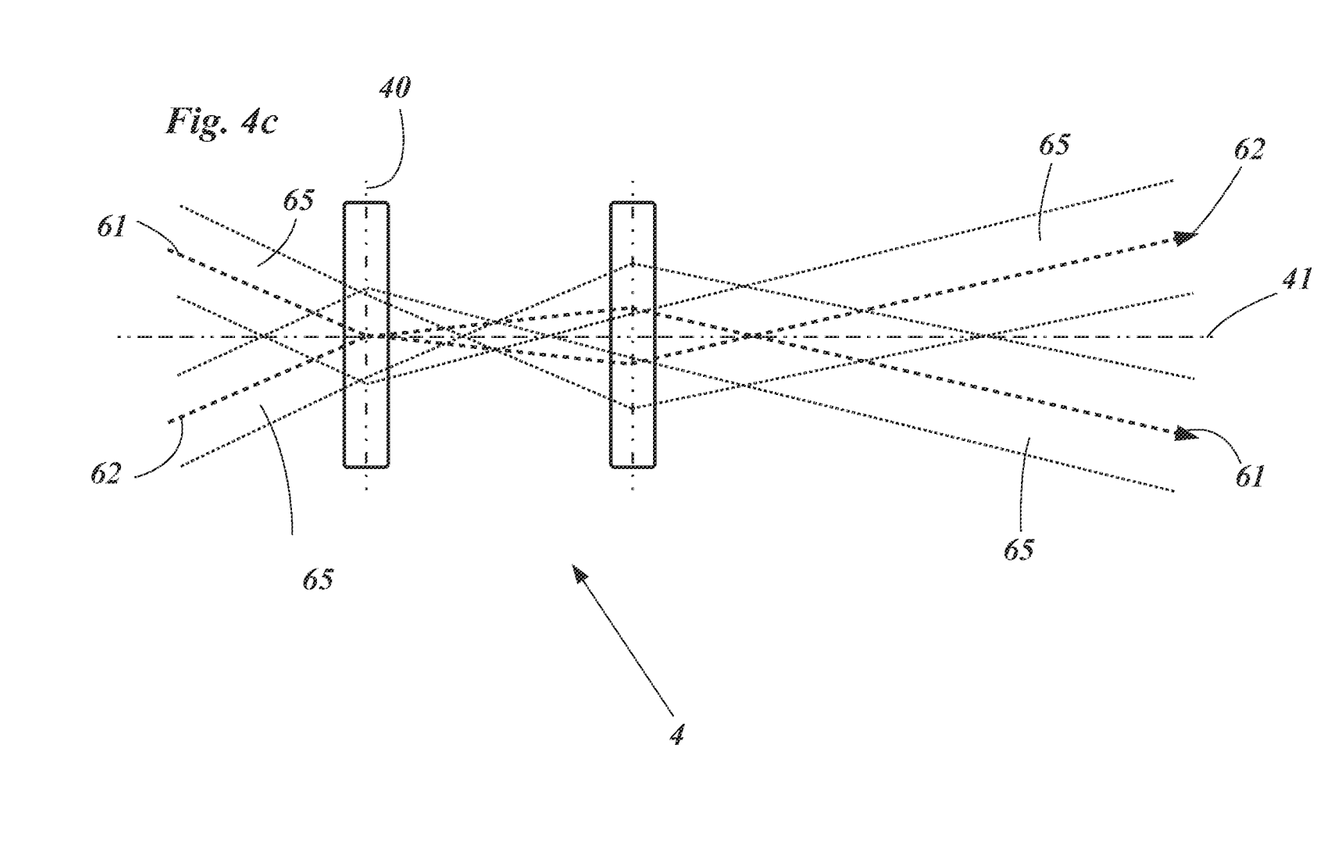
FIG. 4c is a schematic diagram of the beam paths through the telescope with a shift and an angled of incident to the optical axes of the first and second optical signal.

The FIGS. 4a, 4b and 4c show schematic figures for the beam paths through the telescope for different examples. In FIG. 4 the first beam path 61 and the second beam path 62 are guided through the telescope 4 toward the first receiver 51 and the second receiver 52 (not shown in FIG. 4).

In the example of FIG. 4a the telescope 4 is shown schematically as a lens with the entrance plane 40. The entrance plane 40 is in this example the principal plane of the lens. The first and second beam paths 61 and 62 are non-collimated beams entering the telescope 4 with an increasing beam diameter 65. The first and second beam paths 61 and 62 are shifted out of the optical axis 41 and parallel to the optical axis 41. This can be realized for example by two spatially separated fiber outputs as shown in FIG. 3a. In this example the telescope 4 collimates the beams.

In the example of FIG. 4b the telescope 4 is shown schematically as a lens system with two lenses. FIG. 4b differs from FIG. 4a only in the lens system of the telescope 4 and that the first and second beam paths 61 and 62 entering the telescope 4 with collimated beams. This can be realized for example by two shifted fiber outputs with a collimation lens on each fiber output.

The example of FIG. 4c differs from FIG. 4b only in that the first and second beam paths 61 and 62 have different angle $\alpha$ of incident on the entrance plane 40 of the telescope 4. This can be realized for example by a setup as shown in FIG. 3b.

In the FIGS. 4a, 4b and 4c the first and second beam paths 61 and 62 can be drawn by geometrical optics as an approximation with a bend of the beam paths on the principal plane on each lens due to the shift x out of the optical axis 41 of the telescope 4 and/or the angle $\alpha$ to the optical axis 41 of the telescope 4. Due to the shift and/or the angle of the first and second beam paths 61 and 62 to and/or out of the optical axis 41 of the telescope, the first and second beam paths 61 and 62 are guided to two spatially separated receivers (not shown in FIG. 4) outside of the extended optical axis 41 of the telescope.

Figure 5A:
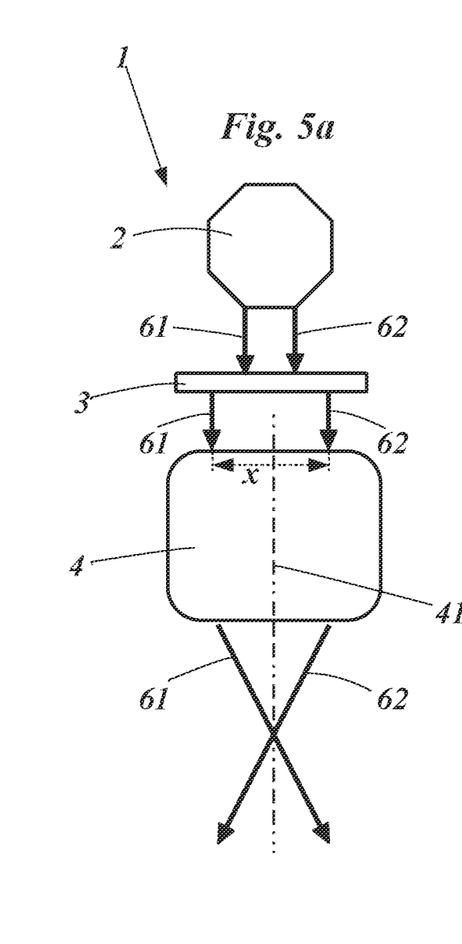
FIG. 5a is a schematic diagram of a first example of the source, the alignment module, and the telescope with shifted first and second optical signal.
Figure 5B:
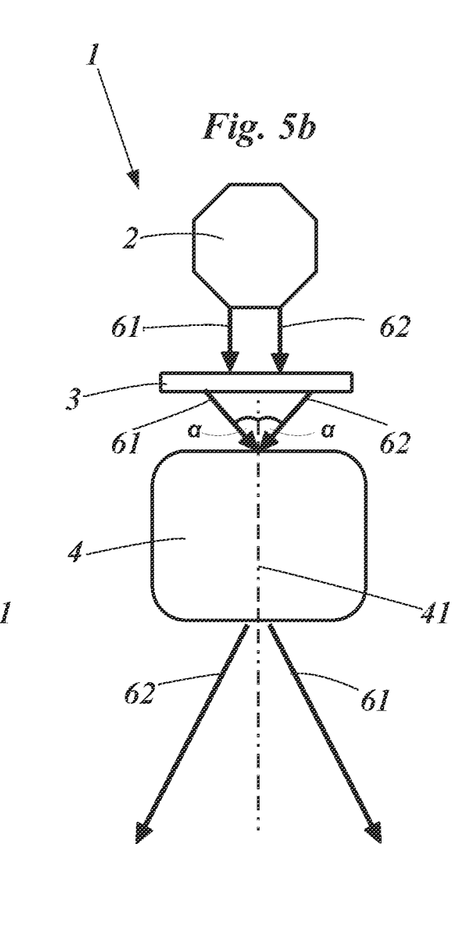
FIG. 5b is a schematic diagram of a second example of the source, the alignment module, and the telescope with an angle of incident to the optical axes of the telescope of the first and second optical signal.
Figure 5C:
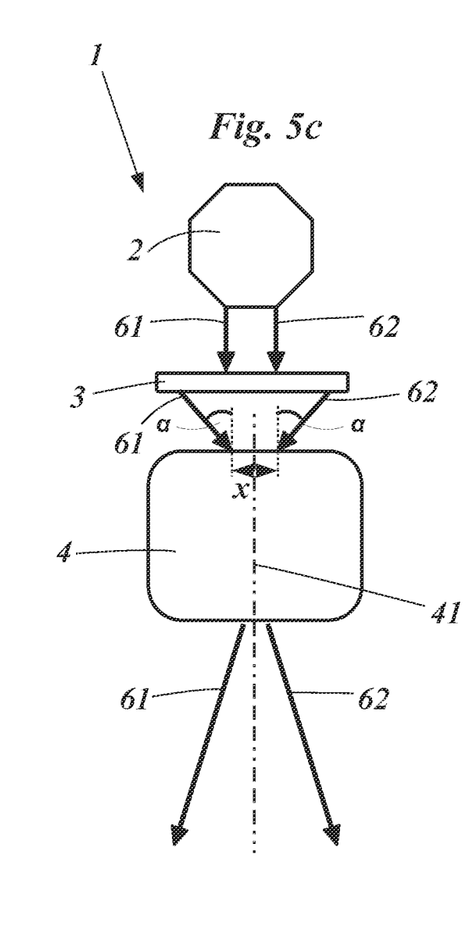
FIG. 5c is a schematic diagram of a third example of the source, the alignment module, and the telescope with shift and an angled of incident to the optical axes of the first and second optical signal.

The FIGS. 5a, 5b and 5c show different schematic diagrams of the transmission system 1 and the method for the transmission with the transmission system 1 from FIG. 1 with the different alignment possibilities from the FIG. 3.

Figure 6:
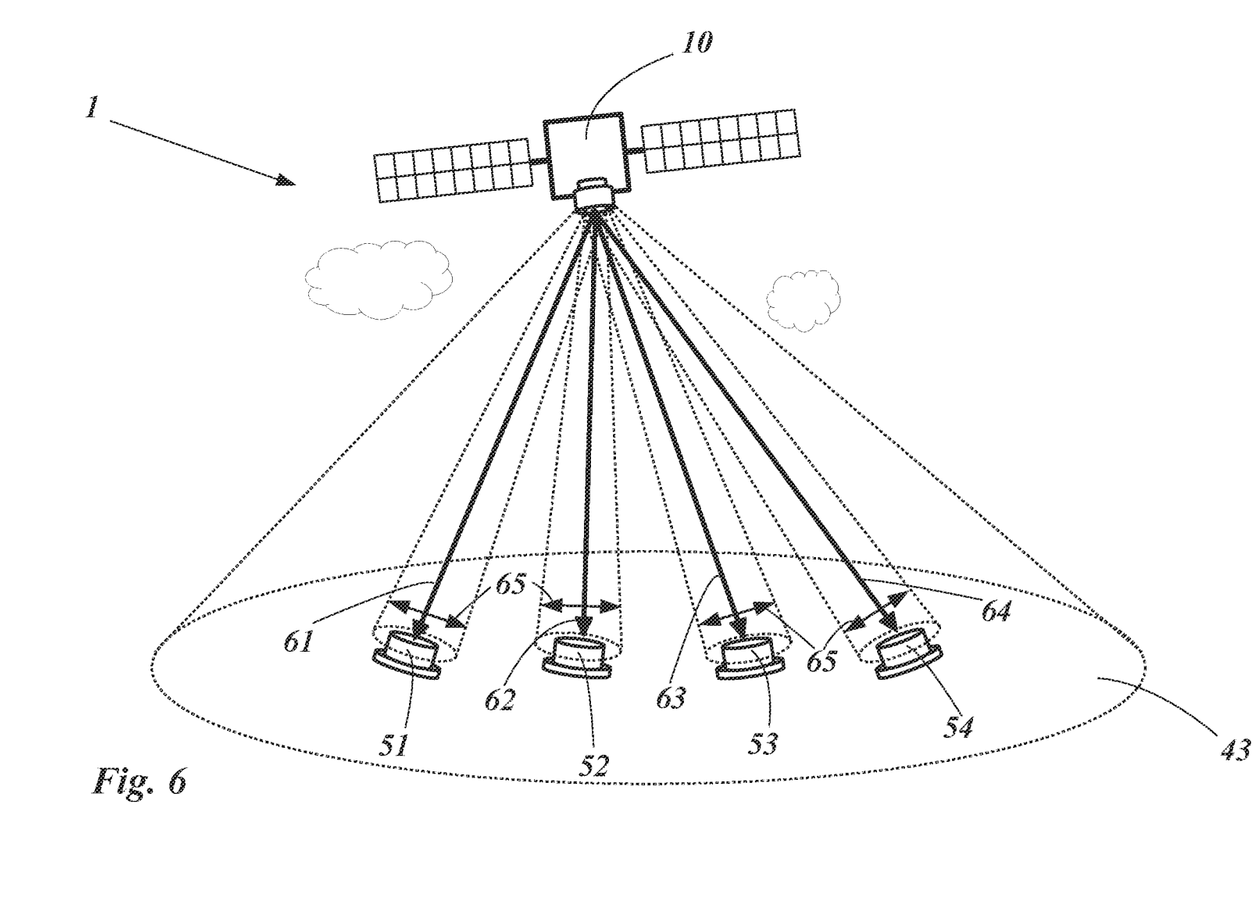
FIG. 6 is a schematic diagram of the inventive method and system from a satellite to four receivers with one or multiple signal generation means or an entangled photon source.

FIG. 6 shows a schematic diagram of the inventive transmission system 1 and the method for the transmission with the source 2, the alignment module 3 and the telescope 4 on a Satellite 10. In FIG. 6 four receivers, the first receiver 51, the second receiver 52, the third receiver 53, and the fourth receiver 54 are located on the ground inside of the field of view 43 of the telescope 4 and spatially separated to each other. In FIG. 6 the beam diameter 65 of each signal, corresponding to the beam paths is shown.

In the example of FIG. 6 the transmission of the optical signals can be realized by multiple downlinks, for example by four optical signals generated by faint laser pulses in four signal generation means 20 in the source 2. According to the sending protocol of the source 2 each receiver can communicate or can enable the generation of a quantum key distribution with each other receiver. For example, in a first-time window a key can be generated between the first receiver 51 and the second receiver 52 and in a second time-window a key can be generated between the first receiver 51 and the third receiver 53. To address different receivers for the communication or for the generation of a key, ether the optical beam paths can be aligned in the alignment module 3 according to the requested receivers, or the protocol for communication or quantum key distribution is adjusted on the requested receivers while the inventive transmission of the optical signals.

In a second example of FIG. 6 with an entangled photon source as a signal generation means 20 in the source 2, entangled photons of an entangled photon pair can be sent to two different receivers via the single telescope 4. Also, here the receivers can be changed by changing the alignment of the beam paths in the alignment module 3.

Figure 7:
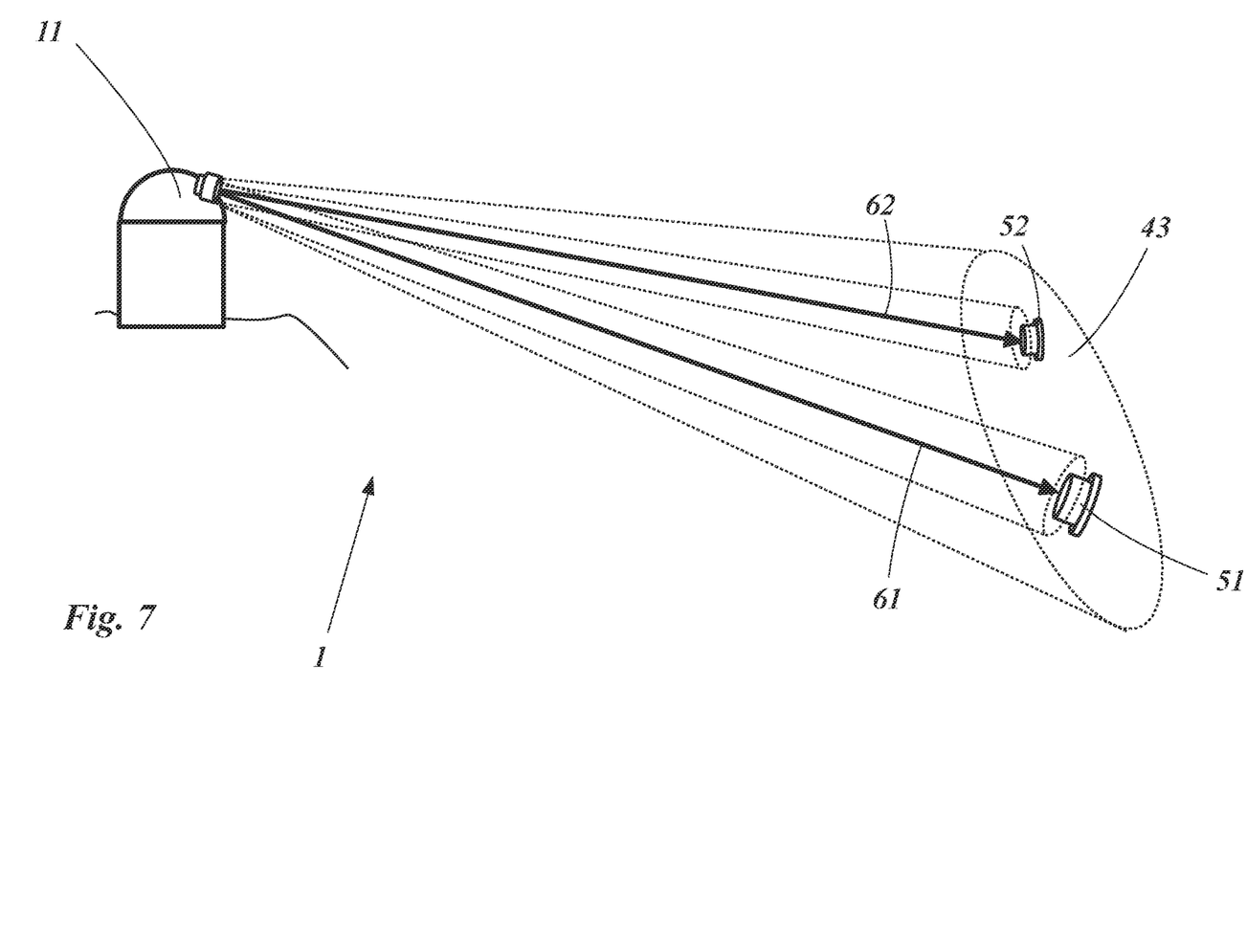
FIG. 7 is a schematic diagram of the inventive method and system from a ground station to two receivers with one or multiple signal generation means or an entangled photon source.

FIG. 7 shows a schematic diagram of the inventive transmission system 1 and the method for the transmission with the source 2, the alignment module 3 and the telescope 4 on a ground station 11. FIG. 7 differs from FIG. 6 only in the location of the source 2, the alignment module 3, and the telescope 4. In FIG. 7 only two receivers are shown, but just as in FIG. 6 more receivers are possible. The ground station 11 can be a stationary ground station as depicted in FIG. 7 in a building, but can also be a mobile ground station, for example by the source 2, the alignment module 3 and the telescope 4 mounted on a car.

Figure 8:
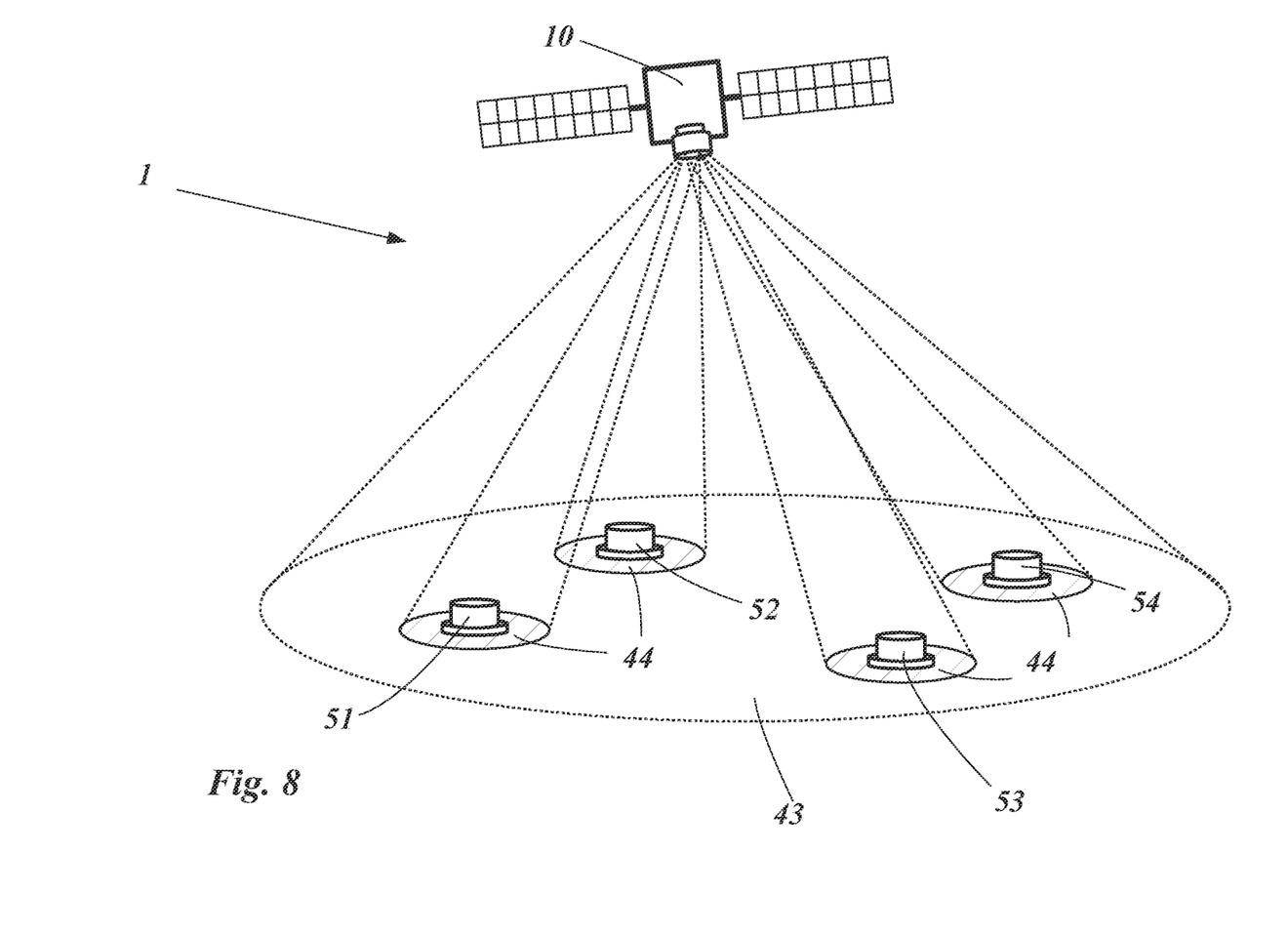
FIG. 8 is a schematic diagram of the inventive method and system from a satellite to four receivers with a telescope with optimized sub-areas.

FIG. 8 shows a schematic diagram of the inventive transmission system 1 and the method for the transmission with the source 2, the alignment module 3 and the telescope 4 on a Satellite 10, whereas the optic in the telescope 4 is designed in order to optimize the transmission of the optical signals on specific beam paths in order to compensate optical errors. In the invention the beam paths are sent through the telescope completely or at least partially outside of the optical axis 41 of the telescope 4. In the example of FIG. 8 the beam guidance inside the telescope 4 is not optimized for beam paths along the optical axis 41, but for beam paths shifted and/or with an angle to the optical axis 41 in order to reduce optical errors for the transmission outside of the optical axis 41 of the telescope 4. This optimization, that means reduction of optical errors by the designed optical components in the telescope 4, leads to sub-areas 44 in which the beam of the signals is corrected for optical errors, or at least partially corrected. For an error corrected transmission of the optical signals, the receivers are located in the sub-areas 44. This optimization can be realized for GEO Satellites or for stationary ground station comprising the telescope and for stationary receivers.

REFERENCE SIGNS 1 transmission system
2 source
3 alignment module
4 telescope
5 receivers
6 optical signals
10 satellite
11 ground station
20 signal generation means
21 separation means
22 mirror
31 first alignment means
32 second alignment means
40 entrance plane
41 optical axes
43 field of view
44 sub-area
45 lens
51 first receiver
52 second receiver
53 third receiver
54 fourth receiver
61 first beam path
62 second beam path
63 third beam path
64 fourth beam path
65 beam diameter

The invention claimed is:

1. A method for the transmission of at least two optical signals to at least two receivers, using elements comprising a source, an alignment module, and one telescope, the at least two receivers comprising a first receiver and a second receiver,
generating, by the source, two or more optical signals, at least a first optical signal and a second optical signal, and
guiding the first optical signal on a first beam path from the source via the alignment module and the one telescope to the first receiver, and guiding the second optical signal on a second beam path from the source via the alignment module and the one telescope to the second receiver,
wherein
the one telescope has a field of view in which the at least first and second receivers are located,
at least one of the first beam path or the second beam path is aligned in the alignment module in order to steer the first optical signal via the one telescope to the first receiver and in order to steer the second optical signal via the one telescope to the second receiver, and
the telescope optics is optimized in order to compensate optical errors for at least one of the first optical signal or the second optical signal, in order to compensate optical errors for optical signals sent on beam paths outside the optical axis of the telescope, the optimization forming optimized sub-areas in which the receivers are located.

2. The method according to claim 1,
wherein
the alignment in the alignment module of at least one of the first beam path or the second beam path comprises at least one of
a shift of at least one of the first beam path or the second beam path, the shift being at least one of parallel to the optical axes of the telescope or off axes to the optical axes of the telescope, or
a tilt of at least one of the first beam path or the second beam path by angle of incidence >0 to the optical axes of the telescope.

3. The method according to claim 2,
wherein at least one of
the shift is a distance x out of the optical axes of the telescope in the entrance plane of the telescope, or
the tilt is an angle $\alpha > 0$ to the optical axes of the telescope in the entrance plane of the telescope.

4. The method according to claim 2,
wherein
the at least first beam path is at least one of shifted by a distance $x_1$ or tilted by an angle $\alpha_1$, and the at least second beam path is at least one of shifted by a distance $x_2$ or tilted by an angle $\alpha_2$, and at least one of $x_1 \neq x_1$, or $\alpha_1 \neq \alpha_2$.

5. The method according to claim 1,
wherein at least one of
the alignment enables a tracking of at least one of the first receiver or the second receiver while the source, and the alignment module, and the telescope or at least one of the first receiver or the second receiver are moving to each other, or
the alignment enables a switching of at least one or the first optical signal or the second optical signal between a multitude of receivers.

6. The method according to claim 1,
wherein
the optical signal is a quantum signal, or a quantum state of light, or a single photon state, or a faint laser pulse, or a single photon, or an entangled photon state, or an entangled photon of an entangled photon pair or an entangled three- or more-photon state.

7. The method according to claim 1,
wherein
the at least first beam of the first optical signal is focused on the first receiver, and the at least second beam of the second optical signal is focused on the second receiver.

8. The method according to claim 1,
wherein
in the at least first beam with the first beam diameter the first receiver is located, and in the at least second beam with the second beam diameter the second receiver is located, the at least first receiver is located outside the second beam with the second beam diameter, and the at least second receiver is located outside the first beam with the first beam diameter.

9. The method according to claim 1,
wherein
the at least first and second optical signals are used for optical communication or quantum key distribution.

10. The method according to claim 1,
wherein
the alignment module comprises at least one of a first alignment means for the first optical signal, in order to align the first optical signal, or
a second alignment means for the second optical signal, in order to align the second optical signal.

11. The method according to claim 1,
wherein
the at least one of the first receiver or the second receiver is located outside of the extended optical axis of the telescope.

12. A system for the transmission of at least two optical signals to at least two receivers, comprising a source, an alignment module, and one telescope, the at least two receivers comprising a first receiver and a second receiver,
wherein in the source the at least two optical signals are generated, at least a first and a second optical signal, whereas the first optical signal is guided on a first beam path from the source via the alignment module and the one telescope to the first receiver and the second optical signal is guided on a second beam path from the source via the alignment module and the one telescope to the second receiver,
wherein
the system comprises a single telescope, whereas the one telescope has a field of view in which the at least first and second receivers are located, and
the alignment module comprises at least one of a first alignment means and a second alignment means, for the at least one of the first optical signal and the second optical signal, in order to steer the at least first optical signal via the one telescope to the first receiver and the second optical signal via the one telescope to the second receiver,
the telescope optics is optimized in order to compensate optical errors for at least one of the first optical signal or the second optical signal, in order to compensate optical errors for optical signals sent on beam paths outside the optical axis of the telescope, the optimization forming optimized sub-areas in which the receivers are located, and
the at least two receivers comprise at least one of a detection means or a redirection means, to respectively detect or redirect the at least first and second optical signals.

13. The system according to claim 12,
wherein
the at least one of the first alignment means or second alignment means comprises at least one of a fiber with a shiftable fiber output, a fiber with a tiltable fiber output, a tiltable beam steering mirror, a deformable mirror, a spatial light modulator, a shiftable lens or lens system, a tiltable lens or lens system, a shiftable prism or prism system, or a tiltable prism or prism system.

14. The system according to claim 12,
further comprising a tracking system in order to track the at least one of a first signal or second signal to the at least one of a first receiver or second receiver.

* * * * *